(12) United States Patent
Lee et al.

(10) Patent No.: US 10,803,385 B2
(45) Date of Patent: Oct. 13, 2020

(54) DEVICE INCLUDING BATTERY

(71) Applicant: LG ELECTRONICS INC., Seoul (KR)

(72) Inventors: Kamin Lee, Seoul (KR); Suyeon Kim, Seoul (KR); Minjung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 77 days.

(21) Appl. No.: 16/181,271

(22) Filed: Nov. 5, 2018

(65) Prior Publication Data

US 2020/0074297 A1 Mar. 5, 2020

(30) Foreign Application Priority Data

Sep. 3, 2018 (KR) .......................... 10-2018-0104773

(51) Int. Cl.
*G06N 3/08* (2006.01)
*H02J 7/00* (2006.01)
*H01M 10/42* (2006.01)
*H01M 10/44* (2006.01)

(52) U.S. Cl.
CPC .......... *G06N 3/08* (2013.01); *H01M 10/4257* (2013.01); *H01M 10/44* (2013.01); *H02J 7/0021* (2013.01); *H01M 2010/4271* (2013.01)

(58) Field of Classification Search
CPC ............ G01R 31/3662; G01R 31/3651; G01R 31/3658; H02J 7/0021; H01M 10/4257; H01M 10/44; H01M 2010/4271
USPC ......................................................... 320/134
See application file for complete search history.

(56) References Cited

U.S. PATENT DOCUMENTS

| 5,825,156 A | * | 10/1998 | Patillon | G01R 31/367 |
| | | | | 702/63 |
| 6,331,762 B1 | * | 12/2001 | Bertness | G01R 31/3648 |
| | | | | 320/134 |
| 10,209,314 B2 | * | 2/2019 | Garcia | G01R 31/367 |
| 2006/0276980 A1 | * | 12/2006 | Mizuno | G01R 31/3648 |
| | | | | 702/63 |

(Continued)

FOREIGN PATENT DOCUMENTS

| CN | 108529360 | 9/2018 |
| EP | 3496053 | 6/2019 |

(Continued)

OTHER PUBLICATIONS

PCT International Application No. PCT/KR2019/011350, Written Opinion of the International Searching Authority dated Dec. 23, 2019, 8 pages.

(Continued)

*Primary Examiner* — M Baye Diao
(74) *Attorney, Agent, or Firm* — Lee, Hong, Degerman, Kang & Waimey

(57) ABSTRACT

A method of controlling a battery is disclosed. The method includes training an artificial neural network to calculate an internal characteristic parameter value of the battery corresponding to a sensed input/output parameter value using training data, sensing the input/output parameter value of the battery, acquiring the characteristic parameter value corresponding to the sensed input/output parameter value using the trained artificial neural network, and controlling charging or discharging of the battery based on the acquired characteristic parameter value.

16 Claims, 10 Drawing Sheets

(56) References Cited

U.S. PATENT DOCUMENTS

2010/0017155 A1* 1/2010 Nareid .............. G01R 31/3648
702/63
2019/0172284 A1 6/2019 Herget et al.

FOREIGN PATENT DOCUMENTS

| JP | 2005053670 | 3/2005 |
|---|---|---|
| JP | 2015215272 | 12/2015 |
| JP | 2019052027 | 4/2019 |
| KR | 1020060110832 | 10/2006 |
| KR | 1020110016691 | 2/2011 |

OTHER PUBLICATIONS

Korean Intellectual Property Office Application No. 10-2018-0104773, Office Action dated Apr. 20, 2020, 5 pages.

* cited by examiner

DEVICE INCLUDING BATTERY

CROSS-REFERENCE TO RELATED APPLICATIONS

Pursuant to 35 U.S.C. § 119(a), this application claims the benefit of earlier filing date and right of priority to Korean Patent Application No. 10-2018-0104773, filed on Sep. 3, 2018, the contents of which are hereby incorporated by reference herein in its entirety.

BACKGROUND OF THE INVENTION

1. Field of the Invention

The present invention relates to a device including a battery, which is capable of predicting an internal characteristic parameter of the battery using a trained artificial neural network and controlling input/output of the battery based on prediction.

2. Discussion of the Related Art

Artificial intelligence is a field of computer engineering and information technology involving studying how computers can think, learn and self-develop in ways similar to human intelligence, and means that computers can emulate intelligent actions of humans.

In addition, artificial intelligence does not exist by itself but is directly or indirectly associated with the other fields of computer science. In particular, many attempts have been made to introduce elements of artificial intelligence into various fields of information technology.

Meanwhile, batteries have been used in a wide range of fields such as electric vehicles, mobile terminals, etc.

A secondary battery includes various materials formed therein and performs charging or discharging according to an electrochemical reaction inside a battery.

Meanwhile, in optimal control of input/output of the battery, the characteristic parameter indicating the state of the internal material of the battery may be used as useful data.

For example, if the characteristic parameter is first grasped, the internal state of the battery such as the capacity of the battery, the state of charge of the battery or the lifespan of the battery can be accurately grasped. In addition, it is possible to perform optimal charge/discharge control, such as calculation of a charging current value capable of maximizing a charge rate while minimally affecting the lifespan of the battery, according to the internal state of the battery.

Meanwhile, the characteristic parameter and the internal state of the battery when the battery is first installed may be grasped based on the specifications of the battery designed by a battery manufacturer.

However, the characteristic parameter is changed while the battery is used, thereby changing the internal state of the battery. In addition, once the battery is installed in a product, it is impossible to grasp the characteristic parameter and the internal state of the battery unless the battery is destroyed.

Accordingly, conventionally, a method of indirectly inferring the internal state of the battery using the specifications of the battery designed by the battery manufacturer and the number of times of charging the battery was used.

Since this method has large error, it is impossible to perform optimal battery control using the accurate internal state of the battery.

In addition, since control was performed in consideration of maximum error for stability of the battery, it is impossible to maximize the performance of the battery.

SUMMARY OF THE INVENTION

An object of the present invention is to provide a device including a battery, which is capable of predicting an internal characteristic parameter of a battery using a trained artificial neural network and controlling input/output of the battery based on prediction.

To achieve the above objects, there is provided a method of controlling a battery including training an artificial neural network to calculate an internal characteristic parameter value of the battery corresponding to a sensed input/output parameter value using training data, sensing the input/output parameter value of the battery, acquiring the characteristic parameter value corresponding to the sensed input/output parameter value using the trained artificial neural network, and controlling charging or discharging of the battery based on the acquired characteristic parameter value.

According to another aspect of the present invention, there is provided a device including a battery including the battery, a sensing unit configured to sense an input/output parameter value of the battery, and a controller configured to acquire an internal characteristic parameter value of the battery corresponding to the sensed input/output parameter value using a trained artificial neural network and to control charging or discharging of the battery based on the acquired characteristic parameter value, wherein the trained artificial neural network is an artificial neural network trained to calculate the characteristic parameter value corresponding to the sensed input/output parameter value using training data.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

DETAILED DESCRIPTION OF THE PREFERRED EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1:
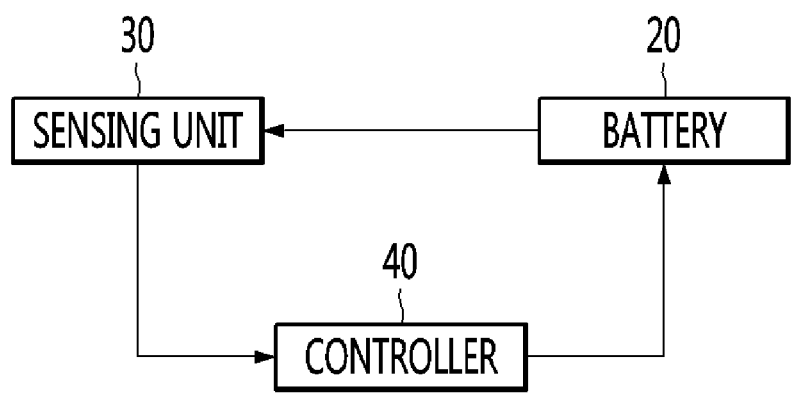
FIG. 1 is a block diagram illustrating a device including a battery according to an embodiment of the present invention.

FIG. 1 is a block diagram illustrating a device including a battery according to an embodiment of the present invention.

The device 10 including the battery according to the embodiment of the present invention may include a battery 20, a sensing unit 30 and a controller 40.

The battery 20 may be a device which is composed of positive and negative electrolytic solutions and may be used as a power source by generating current electromotive force by a chemical action.

The battery 20 is a secondary battery capable of switching between chemical energy and electric energy plural times.

Meanwhile, the battery 20 may be discharged. Specifically, the battery 20 may supply power to the components included in the device 10 including the battery under control of the controller 40.

Meanwhile, the battery 20 may be charged. Specifically, the device 10 including the battery may include a charging port (not shown), and the battery 20 may be connected to the charging port (not shown). In addition, the battery 20 may receive electric energy from the outside through the charging port (not shown) and perform charging, under control of controller 40.

Meanwhile, the device 10 including the battery may include a charging/discharging control circuit (not shown) for controlling charging or discharging of the battery 20, under control of the controller 40.

In this case, the charging/discharging control circuit (not shown) may control charging voltage or charging current at the time of charging or control discharging voltage or discharging current at the time of discharging the battery 20, under control of the controller 40.

The sensing unit 30 may sense the input/output parameter value of the battery.

Here, the input/output parameter of the battery may be measured outside the battery and may include at least one of a voltage, current and a temperature. In addition, the input/output parameter value of the battery may include at least one of a voltage value, a current value and a temperature value as a numerical value of each parameter.

Meanwhile, the controller 40 may acquire a state of charge (SOC) of the battery based on the input/output parameter value of the battery.

Here, the SOC expresses the available capacity of the battery as a percentage. The controller 40 may calculate the SOC of the battery based on at least one of the voltage, current and temperature of the battery.

Meanwhile, the controller 40 may control overall operation of the device including the battery.

Specifically, the controller 40 may control charging of the battery. Controlling charging of the battery means controlling the charging/discharging control circuit (not shown) to control a charging voltage or charging current at the time of charging the battery 20.

In addition, the controller 40 may control discharging of the battery. Controlling discharging of the battery means controlling the charging/discharging control circuit (not shown) to control a discharging voltage or discharging current at the time of discharging the battery 20.

In addition, the controller 40 may operate the components in the device 10 including the battery using the discharged current.

In addition, the controller 40 may acquire the internal characteristic parameter value of the battery corresponding to the input/output parameter using a trained artificial neural network and control charging or discharging of the battery based on the acquired characteristic parameter value.

Meanwhile, the device 10 including the battery may include a storage unit (not shown) for storing a plurality of control rules. In addition, the controller 40 may control charging or discharging of the battery according to the control rule corresponding to the acquired characteristic value among the plurality of control rules.

In addition, the controller 40 may acquire the control rule corresponding to the input/output parameter value and the acquired characteristic parameter value using the trained second artificial neural network.

Meanwhile, in FIGS. 2 and 3, as an example of the device 10 including the battery, a mobile terminal 100 and an electric vehicle 200 will be described. However, the present invention is not limited thereto and is applicable to all devices including a battery to perform charging/discharging.

Figure 2:
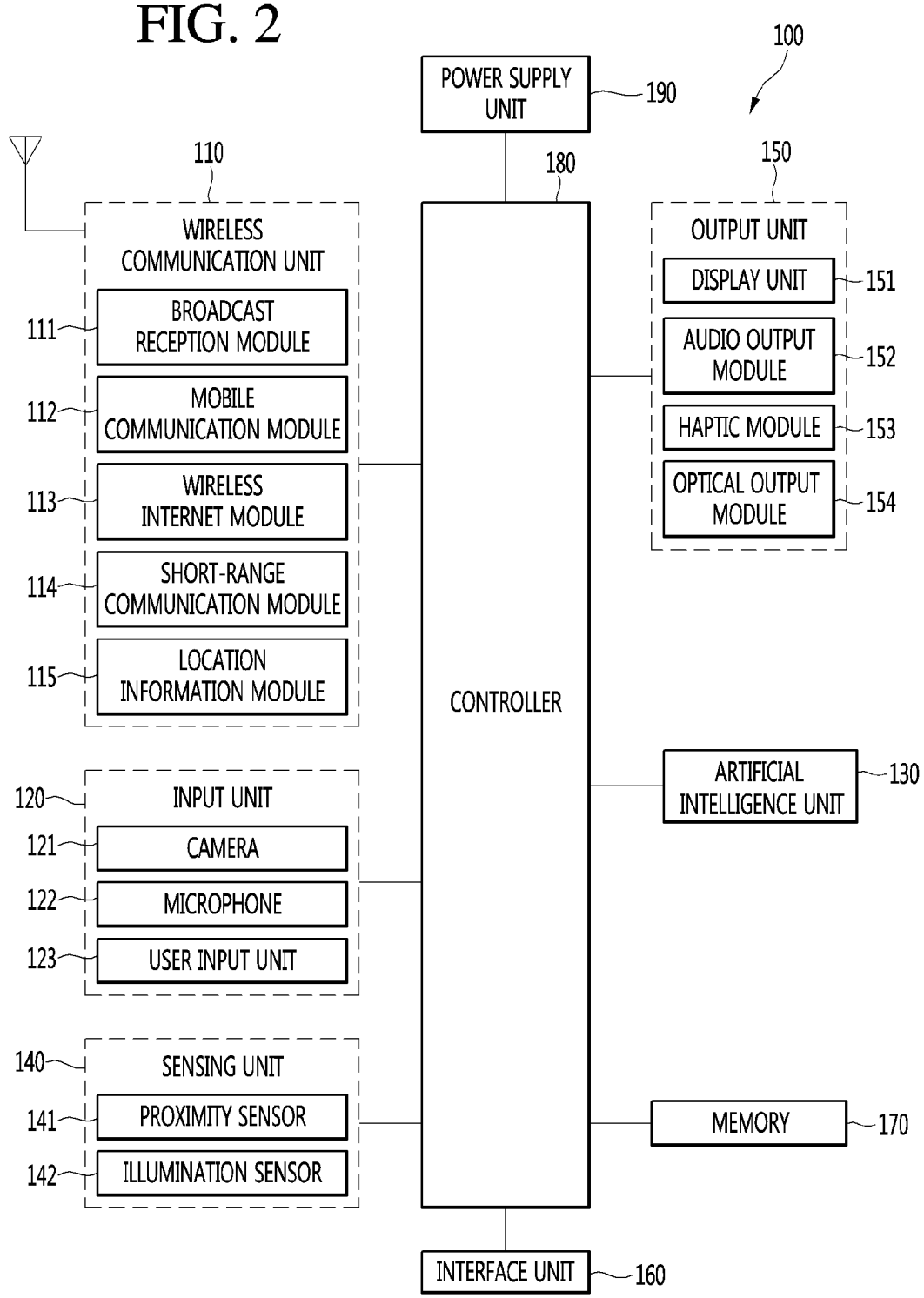
FIG. 2 is a block diagram illustrating a mobile terminal according to the present invention.

FIG. 2 is a block diagram illustrating a mobile terminal according to the present invention.

The mobile terminal 100 is shown having components such as a wireless communication unit 110, an input unit 120, an artificial intelligence unit 130, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 2, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

An artificial intelligence unit 130 is responsible for processing information based on artificial intelligence technology and may include one or more modules for performing at least one of learning of information, inference of information, perception of information and processing of a natural language.

The artificial intelligence unit 130 may perform at least one of learning, inference and processing of vast amounts of information (big data) such as information stored in the mobile terminal, surrounding environmental information of the mobile terminal and information stored in a communicable external storage. In addition, the artificial intelligence unit 130 may control the mobile terminal to predict (infer) executable operation of at least one mobile terminal and to perform most feasible operation of the at least one predicted operation, using the information learned using the machine learning technology.

The machine learning technology refers to technology of collecting and learning a large amount of information based on at least one algorithm and determining and predicting information based on the learned information. Learning of information refers to operation for grasping the characteristics, rules and criteria of judgement of the information, quantifying a relationship between information and information, and predicting new data using a quantified pattern.

An algorithm used by such machine learning technology may be a statistical based algorithm and may include, for example, a decision tree using a tree structure as a prediction model, an artificial neural network for emulating the neural network structure and function of an organism, genetic programing based on biological evolutionary algorithms, clustering for distributing observed examples into subsets such clusters, and a Monte-Carlo method of calculating the probability of a function value through a randomly extracted number.

As a field of machine learning technology, deep learning technology refers to technology of performing at least one of learning, determining and processing of information using an artificial neural network algorithm. The artificial neural network may have a structure for connecting a layer and a layer and transmitting data between the layer and the layer. Such deep learning technology may learn vast amounts of information through an artificial neural network using a graphic processing unit (GPU) optimized for parallel computation.

Meanwhile, the artificial intelligence unit 130 may collect (sense, monitor, extract, detect or receive) signals, data, information, etc. input to or output from the components of the mobile terminal in order to collect vast amounts of information for applying machine learning technology. In addition, the artificial intelligence unit 130 may collect (sense, monitor, extract, detect or receive) data, information, etc. stored in an external storage (e.g., a cloud server) connected through communication. More specifically, collection of information may be understood as the term including sensing of information through a sensor, extraction of information stored in the memory 170, or reception of information from the external storage through communication.

The artificial intelligence unit 130 may sense information in the mobile terminal, surrounding environment information of the mobile terminal and user information through the sensing unit 140. In addition, the artificial intelligence unit 130 may receive a broadcast signal and/or broadcast related information, wireless signal, wireless data, etc. through the wireless communication unit 110. In addition, the artificial intelligence unit 130 may receive image information (or signal), audio information (or signal), data or information input by a user from the input unit.

Such an artificial intelligence unit 130 may collect vast amounts of information in real time in the background and learn the information, and store information processed in an appropriate form (e.g. knowledge graph, command policy, personalization database, dialog engine, etc.) in the memory 170.

In addition, when operation of the mobile terminal is predicted based on the information learned using the machine learning technology, the artificial intelligence unit 130 may control the components of the mobile terminal and send a control command for executing the predicted operation to the controller 180, in order to execute the predicted operation. The controller 180 may control the mobile terminal based on the control command to execute the predicted operation.

Meanwhile, when specific operation is performed, the artificial intelligence unit 130 may analyze history information indicating performing of the specific operation through machine learning technology and update existing learned information based on the analyzed information. Therefore, the artificial intelligence unit 130 may improve information prediction accuracy.

Meanwhile, in this specification, the artificial intelligence unit 130 and the controller 180 may be understood as the same component. In this case, the function performed by the controller 180 described in this specification may be described as being performed by the artificial intelligence unit 130, and the controller 180 may be referred to as the artificial intelligence unit 130 or the artificial intelligence unit 130 may be referred to as the controller 180.

Alternatively, in this specification, the artificial intelligence unit 130 and the controller 180 may be understood as different components. In this case, the artificial intelligence unit 130 and the controller 180 may perform a variety of control on the mobile terminal through data exchange. The controller 180 may perform at least one function on the mobile terminal based on a result derived from the artificial intelligence unit 130 or control at least one of the components of the mobile terminal. Further, the artificial intelligence unit 130 may operate under control of the controller 180.

The sensing unit 140 is typically implemented using one or more sensors configured to sense internal information of the mobile terminal, the surrounding environment of the mobile terminal, user information, and the like. For example, in FIG. 2, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 2, or activating application programs stored in the memory 170. As one example, the controller 180 controls some or all of the components illustrated in FIG. 2 according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 2, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be a server which generates and transmits a broadcast signal and/or broadcast associated information, or a server which receives a pre-generated broadcast signal and/or broadcast associated information, and sends such items to the mobile terminal.

The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof. Meanwhile, the device 10 including the battery may include the components of the mobile terminal 100 described with reference to FIG. 2 and perform functions performed by the components of the mobile terminal 100.

Figure 3:
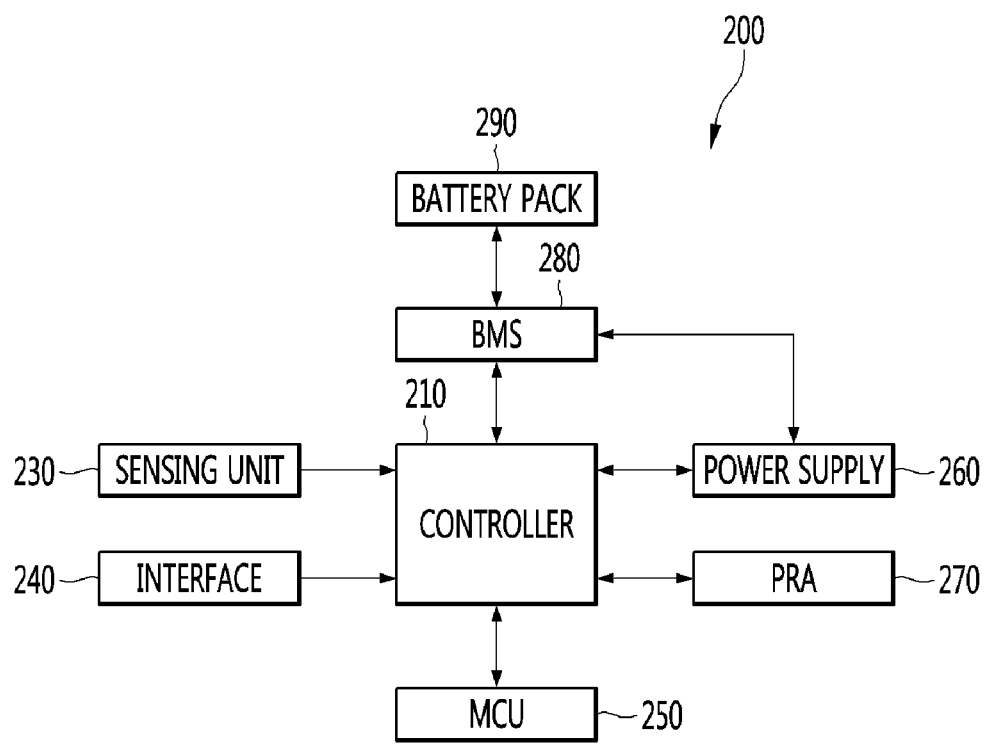
FIG. 3 is a schematic block diagram showing the internal configuration of an electric vehicle.

FIG. 3 is a schematic block diagram showing the internal configuration of an electric vehicle.

Referring to FIG. 3, the electric vehicle 200 according to the present invention may include a controller 210, a sensing unit 230, an interface 240, a motor control unit (MCU) 250, a power supply 260, a power relay assembly (PRA) 270, a battery management system (BMS) 280 and a battery pack 290.

The electric vehicle 200 includes the battery pack 290 including at least one battery, and receives power from the outside in a predetermined charging station or a vehicle charging facility or a home and charge the battery pack 290.

The BMS 280 determines the remaining capacity of the battery pack 290 and whether charging is necessary and performs management in supply of the charging current stored in the battery to the components of the electric vehicle.

At this time, when the battery is charged and used, the BMS 280 uniformly maintains a voltage difference between the cells in the battery and performs control to prevent the battery from being overcharged or overdischarged, thereby increasing the lifespan of the battery.

In addition, the BMS 280 includes a protection circuit for protecting supplied current such that the vehicle is driven for a long time through current management.

The battery pack 290 includes a plurality of batteries and stores electric energy with a high voltage.

The power supply 260 includes a connection terminal or a connection circuit for connection with a charging station, and applies charging current to the battery pack 290 under control of the BMS 280 to charge the battery when an external power supply is connected. In addition, the power supply 260 may change power stored in the battery pack 290 to power which may be used in each component and supply the changed power.

The sensing unit 230 senses a signal generated while the vehicle is driven or while predetermined operation is performed, and inputs the signal to the controller 210.

The sensing unit 230 includes a plurality of sensors inside and outside the vehicle and inputs various sensing signals. The type of the sensor may be changed depending on the installed position.

The interface 240 includes input means for inputting a predetermined signal by operation of a driver, output means for outputting information during the current state operation of the electric vehicle, and operation means operated by the driver to control the vehicle. At this time, the output means includes a display unit for displaying information, a speaker for outputting music, effect sound and warning sound, and various states. In addition, the input means includes a plurality of switches, buttons, etc. for operation of a turn signal lamp, a tail lamp, a head lamp, a brush, etc. while the vehicle is driven.

In addition, the interface 240 includes operation means for operation of a steering wheel, an accelerator and a brake.

The MCU 250 generates a control signal for driving at least one connected motor and generates and applies a predetermined signal for motor control. In addition, the MCU 250 changes high-voltage power according to the characteristics of the motor and supplies the changed power.

The PRA 270 includes a plurality of relays for switching a high voltage and a sensor and applies or blocks the high-voltage power received from the battery pack 290 to a specific position. In particular, the PRA 270 sequentially controls the relays not to suddenly supply the high-voltage power at the time of starting the vehicle, thereby stably supplying power to the vehicle.

The controller 210 performs control to generate and apply a predetermined command to perform predetermined operation in correspondence with input of the interface 240 and the sensing unit 230 and controls input/output of data to display the operation state of the electric vehicle.

In addition, the controller 210 manages the battery pack 290 through the BMS 280, applies a switching signal to the PRA 270 to control startup of the vehicle, and controls power supply to a specific position (part).

Meanwhile, the device 10 including the battery may include the components of the electric vehicle 200 described with reference to FIG. 3 and perform the functions performed by the components of the electric vehicle 200.

Figure 4:
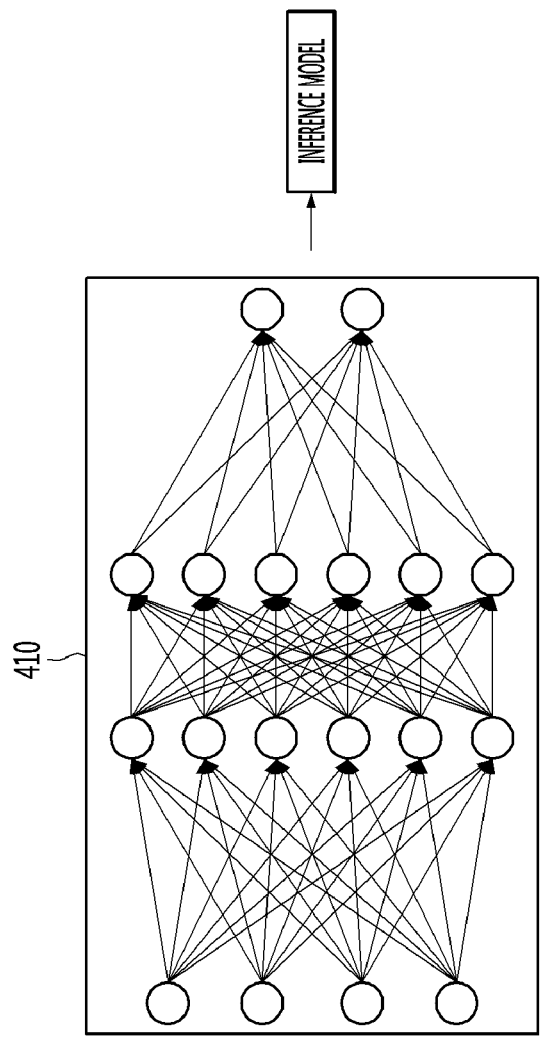
FIGS. 4 and 5 are diagrams illustrating a method of training an artificial neural network to calculate an internal characteristic parameter value corresponding to an input/output parameter value according to an embodiment of the present invention.
Figure 5:
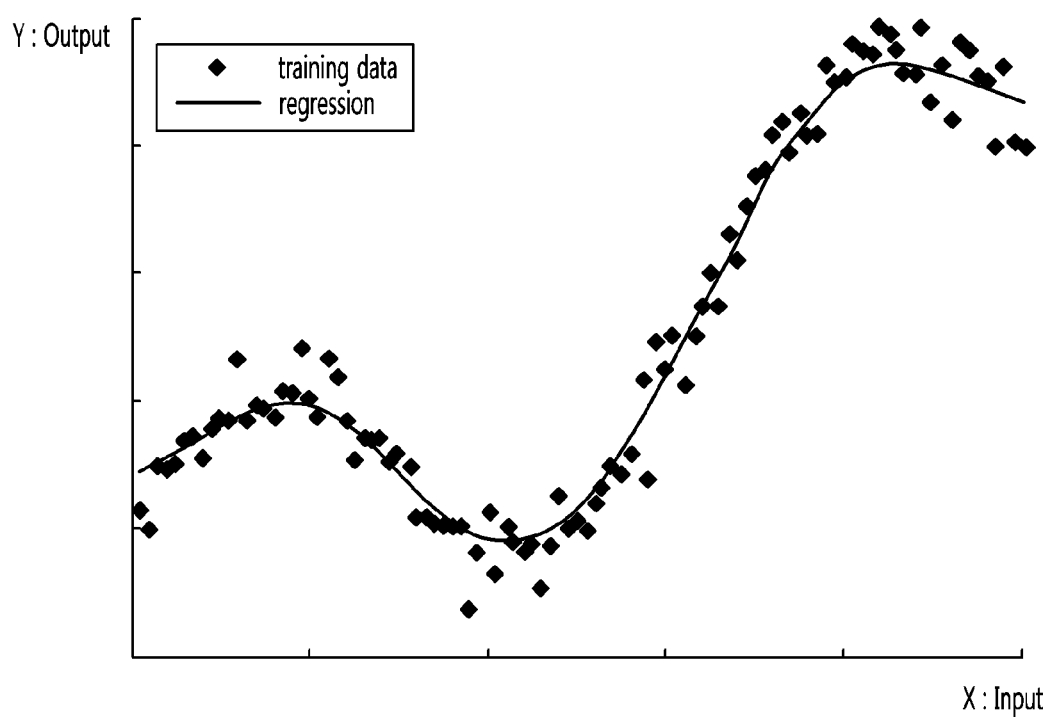

FIGS. 4 and 5 are diagrams illustrating a method of training an artificial neural network (ANN) to calculate an internal characteristic parameter value corresponding to an input/output parameter value according to an embodiment of the present invention.

The ANN (410) is a statistical learning algorithm inspired by the biological neural networks in machine learning and cognitive science. Artificial neurons (nodes) forming a network by connecting synapses change the strength of connection of the synapses through learning to have a problem solution ability.

The ANN may be trained to calculate a characteristic parameter value corresponding to the sensed input/output parameter value using training data.

Here, the characteristic parameter may be a parameter indicating the state of the internal material of the battery.

Specifically, the characteristic parameter may include at least one of effective conductivity σeff, electronic conductivity σ+, solid diffusivity Ds+ and Ds−, a reaction rate constant of exchange current K+ and K−, tortuosity τ−, porosity ε−, electrolyte concentration Ce, electrolyte conductivity Ke_scale, electrolyte diffusivity De_scale, a ratio of cations in conductivity of cations and anions (transference number t0+), a degree of shift as the capacity of a positive electrode/negative electrode is degraded (Qshift) and a degree of reduction in capacity of the positive electrode/negative electrode (Qscale+, Qscale−).

In addition, the characteristic parameter value of the battery may be the numerical value of each parameter or a numerical value obtained by normalizing each parameter.

In addition, the controller 40 may learn the artificial neural network to calculate the characteristic parameter value corresponding to the sensed input/output parameter value using training data. Here, the training data may include the input/output parameter value of the battery 20 and the characteristic parameter value corresponding to the input/output parameter value.

That is, as input data for training the artificial neural network, the input/output parameter of the battery 20 and the characteristic parameter value when the battery 20 indicates a specific input/output parameter value may be used. In addition, by training the neural network using vast amounts of input data, the trained neural network may calculate a relationship between the input/output parameter value and the characteristic parameter value. In this case, when the input/output parameter value of the battery is sensed and the sensed input/output parameter value is input to the trained neural network, the characteristic parameter value corresponding to the sensed input/output parameter value may be output.

Meanwhile, the training data may be time series data continuously observed over time. For example, the training data may be an input/output parameter value continuously measured over time and a characteristic parameter value corresponding to the input/output parameter value.

Accordingly, as the ANN, a deep neural network (DNN) which is useful for extracting the features of time series data.

In this case, the controller 40 may learn the DNN using an input/output parameter value and a characteristic parameter value corresponding to the input/output parameter value based on deep learning.

In addition, a multi-layer network such as multi-layer perceptron (MLP), a time delay neural network (TDNN) or a recurrent neural network (RNN) may be used as an ANN.

FIG. 5 shows a graph related to multiple linear regression analysis as an example of a method of training an artificial neural network.

Here, an X axis may mean an input/output parameter value and a Y axis may mean an internal characteristic parameter value of a battery.

A plurality of dots may mean training data including an input/output parameter value of a battery and a characteristic parameter value corresponding to the input/output parameter value.

In this case, the ANN may learn a plurality of pieces of training data to calculate regression, that is, a relationship between the input/output parameter and the characteristic parameter.

Meanwhile, although the artificial neural network is described as being trained by the controller 40 in the above description, the present invention is not limited thereto.

Specifically, the artificial neural network is trained by another computing device and the trained artificial neural network may be installed in the device 10 including the battery as an inference model for inferring the internal characteristic parameter of the battery 20 in the device 10 including the battery.

In this case, a program corresponding to the trained artificial neural network may be stored in the storage unit (not shown) in the device 10 including the battery.

Meanwhile, the training data may include the input/output parameter value of one or more batteries corresponding to the battery 20 and the characteristic parameter value corresponding to the input/output parameter value of one or more batteries.

Here, the one or more batteries corresponding to the battery 20 is not equal to the battery 20 but has the same relationship as the relationship between the input/output parameter value and the characteristic parameter value in the battery 20, regardless of the number and existence thereof.

For example, the one or more batteries corresponding to the battery 20 may be another battery having the same performance or specifications as the battery 20 installed in the device 10. In this case, a computing device may measure the input/output parameter value and the characteristic parameter value corresponding to the input/output parameter value in the one or more batteries having the same performance or specifications and learn the artificial neural network using the measured values.

As another example, the one or more batteries corresponding to the battery 20 may be a virtual battery having the same performance or specifications as the battery 20 installed in the device 10. In this case, the computing device may generate training data including an input/output parameter and a characteristic parameter based on the specifications of the virtual battery and learn the artificial neural network using the training data.

Figure 6:
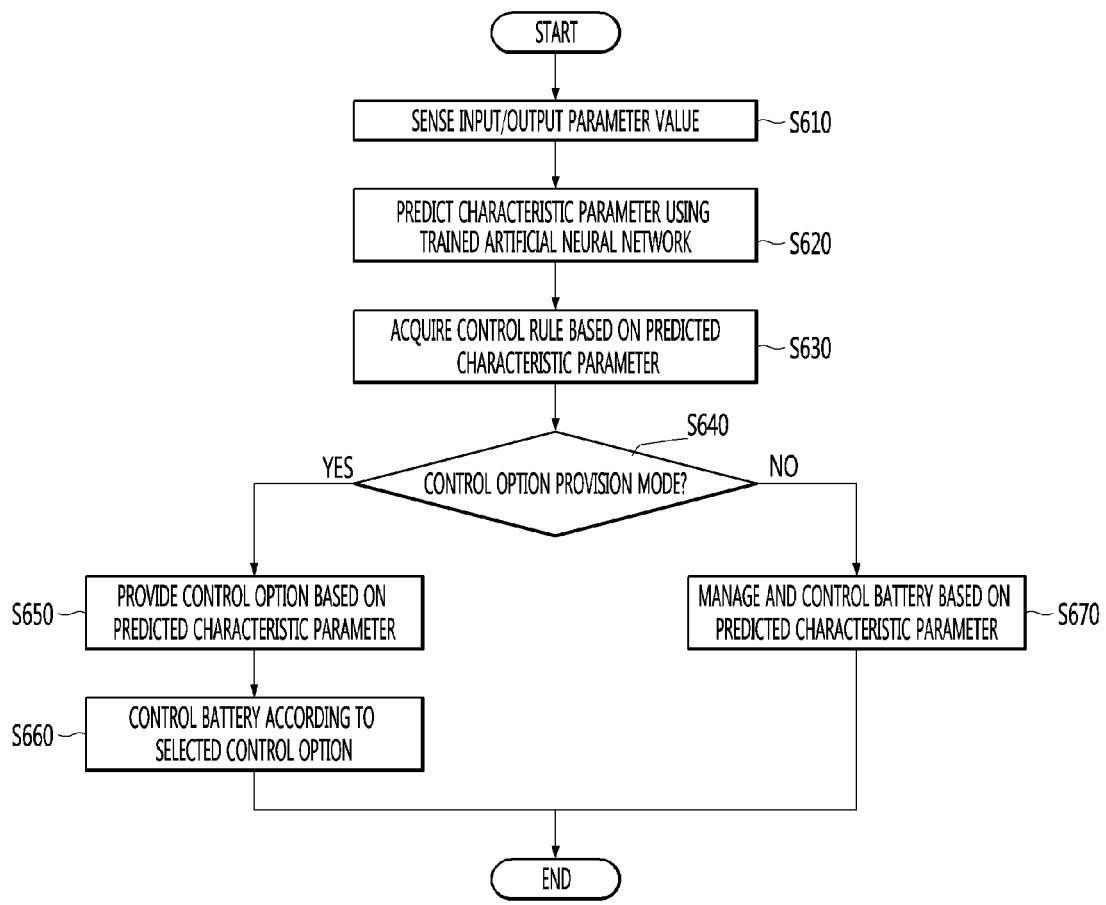
FIG. 6 is a flowchart illustrating a method of controlling charging or discharging of a battery after training of an artificial neural network.

FIG. 6 is a flowchart illustrating a method of controlling charging or discharging of a battery after training of an artificial neural network.

The method of controlling charging or discharging of the battery according to the embodiment of the present invention may include sensing the input/output parameter of the battery (S610), acquiring the internal characteristic parameter of the battery corresponding to the sensed input/output parameter using the trained artificial neural network (S620), acquiring a control rule based on the characteristic parameter (S630), determining whether a control option provision mode is set (S640), providing a control option based on the characteristic parameter when the control option provision mode is set (S650), controlling charging or discharging of the battery according to the selected control option (S660), and controlling charging or discharging of the battery based on the characteristic parameter when the control option provision mode is not set (S670).

First, the sensing of the input/output parameter of the battery (S610) and the acquiring of the internal characteristic parameter of the battery corresponding to the sensed input/output parameter using the trained artificial neural network (S620) will be described with reference to FIGS. 7 and 8.

Figure 7:
FIGS. 7 and 8 are views illustrating a method of predicting an internal characteristic parameter value of using an input/output parameter value according to an embodiment of the present invention.
Figure 8:
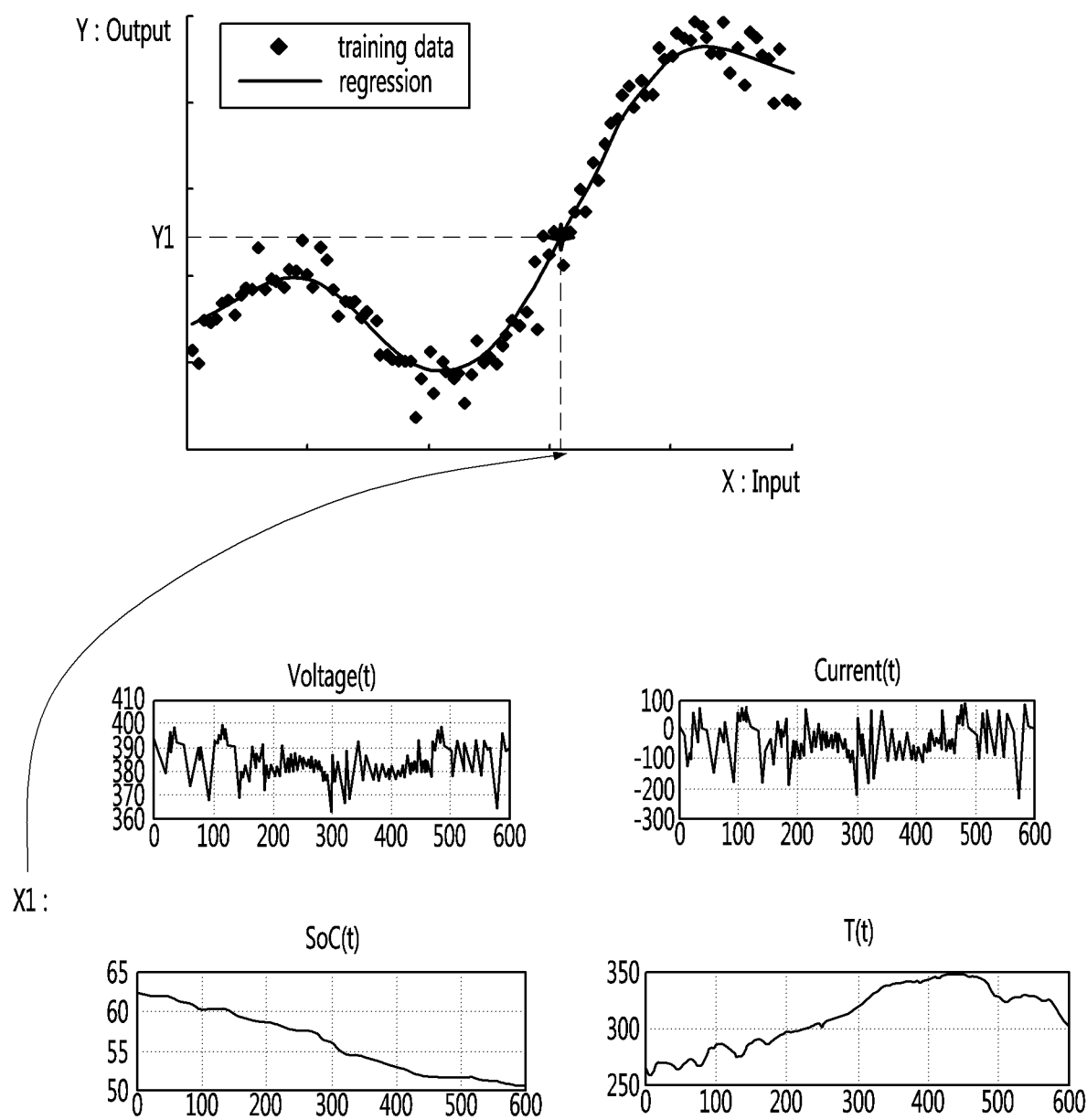

FIGS. 7 and 8 are views illustrating a method of predicting an internal characteristic parameter value of using an input/output parameter value according to an embodiment of the present invention.

Referring to FIG. 7, the controller 40 may acquire the internal characteristic parameter value of the battery corresponding to the sensed input/output parameter value using the trained artificial neural network.

Specifically, the controller 40 may input the input/output parameter value of the battery 20 sensed by the sensing unit 30 to the trained artificial neural network.

In this case, the trained artificial neural network may predict and output the internal characteristic parameter value of the battery 20 based on the sensed input/output parameter value of the battery 20 and the result of training.

For example, as shown in FIG. 8, if a multiple linear regression analysis method is used, the ANN learns a plurality of training data to calculate regression, that is, a relationship between the input/output parameter and the characteristic parameter.

When the input/output parameter value including at least one of a voltage value, a current value, a temperature value and a state of charge (SOC) value is input as input data X1, the trained artificial neural network may output the characteristic parameter value corresponding to the input input/output parameter value as output data Y1.

Meanwhile, the controller 40 may sense the input/output parameter value for a predetermined time and acquire the characteristic parameter value corresponding to the sensed input/output parameter value for the predetermined time using the trained artificial neural network.

Specifically, the input/output parameter and the characteristic parameter value are time series data in which a current value affects the following values, and the trained artificial neural network was trained using the time series data.

Accordingly, the controller 40 may sense the time series value of the input/output parameter for a predetermined time and acquire the characteristic parameter value corresponding to the time series value of the input/output parameter using the trained artificial neural network.

Returning to FIG. 6, the method of controlling charging or discharging of the battery according to the embodiment of the present invention may include the acquiring of the control rule based on the characteristic parameter (S630).

Specifically, the controller 40 may acquire the internal state information of the battery 20 based on the acquired characteristic parameter value.

Here, the internal state information of the battery 20 may include at least one of battery deterioration, battery a degree of abnormality (overcharge or overdischarge), a charge threshold and a discharge threshold.

In this case, the controller 40 may control the display unit to display the internal state information of the battery 20.

In addition, the controller 40 may set the control rule based on the internal state information. Here, the control rule may include at least one of whether a battery is charged, a charging current value of the battery, a charging voltage value of the battery, whether the battery is discharged, a discharging voltage value of the battery, a discharging current value of the battery, a charge rate of the battery, a charge amount of the battery, a discharge rate of the battery, and a discharge amount of the battery. In this case, the internal state information and the control rule corresponding to the internal state information may be stored in the storage unit as a table.

For example, if the effective conductivity among the characteristic parameters of the battery 20 is reduced by 20% as compared to the effective conductivity when the battery is first installed, the controller 40 may determine that deterioration of the battery has progressed by 20%. In this case, the controller 40 may set a control rule for decreasing the charging current value of the battery to reduce deterioration. In addition, the controller 40 may control the charging current value according to the set control rule to perform charging.

As another example, if the effective conductivity among the characteristic parameters of the battery 20 is in an error range of the effective conductivity when the battery is first installed, the controller 40 may set a control rule for performing charging with an allowable maximum current value to increase a charge rate. In addition, the controller 40 may control the charging current value according to the set control rule to perform charging.

As another example, if abnormal information such as overcharge or overdischarge is acquired based on the characteristic parameter value, the controller 40 may stop charging or discharging.

As another example, the controller 40 may calculate the charging current value capable of achieving a fastest charge rate without affecting the performance of the battery based on the characteristic parameter value and perform charging according to the calculated charging current value.

Meanwhile, the controller 40 may control charging or discharging of the battery according to the control rule corresponding to the acquired characteristic parameter, without acquiring the internal state information of the battery from the characteristic parameter.

Specifically, the storage unit may store a plurality of control rules, and the controller may control charging or discharging of the battery according to the control rule corresponding to the acquired characteristic parameter value among the plurality of control rules.

For example, assume that the characteristic parameter includes a first parameter, a second parameter, a third parameter and a fourth parameter.

The storage unit (not shown) may store the control rule corresponding to at least one of a plurality of parameter values included in the characteristic parameter.

For example, a first control rule corresponding to a first value of the first parameter and a second value of the second parameter, a second control rule corresponding to a third value of the first parameter, a fourth value of the second parameter and a fifth value of the third parameter, and a third control rule corresponding to a sixth value of the third parameter may be stored.

In addition, the controller 40 may control charging or discharging of the battery according to the rule corresponding to the acquired characteristic parameter value.

Meanwhile, the method of controlling charging or discharging of the battery according to the embodiment of the present invention may include determining whether the control option provision mode is set (S640).

Specifically, the device 10 including the battery may operate in a normal mode or a control option provision mode. Here, the control option provision mode may refer to a mode in which a plurality of control options is provided to a user and operation is performed according to the control option selected by the user, and the normal mode may refer to a mode in which operation is performed according to the control rule set by the controller 40 without providing the plurality of control options.

Meanwhile, if the operation mode of the device 10 including the battery is a control option provision mode, the controller 40 may acquire the plurality of control rules based on the acquired characteristic parameter value and control the display unit to display a plurality of control options respectively corresponding to the plurality of control rules (S650).

For example, the controller 40 may acquire a first control rule for performing charging with a first charging current value and a second control rule for performing charging with a second charging current value less than the first charging current value, based on the acquired characteristic parameter.

In addition, the controller 40 may display a first control option corresponding to the first control rule and a second control option corresponding to the second control rule.

Figure 9:
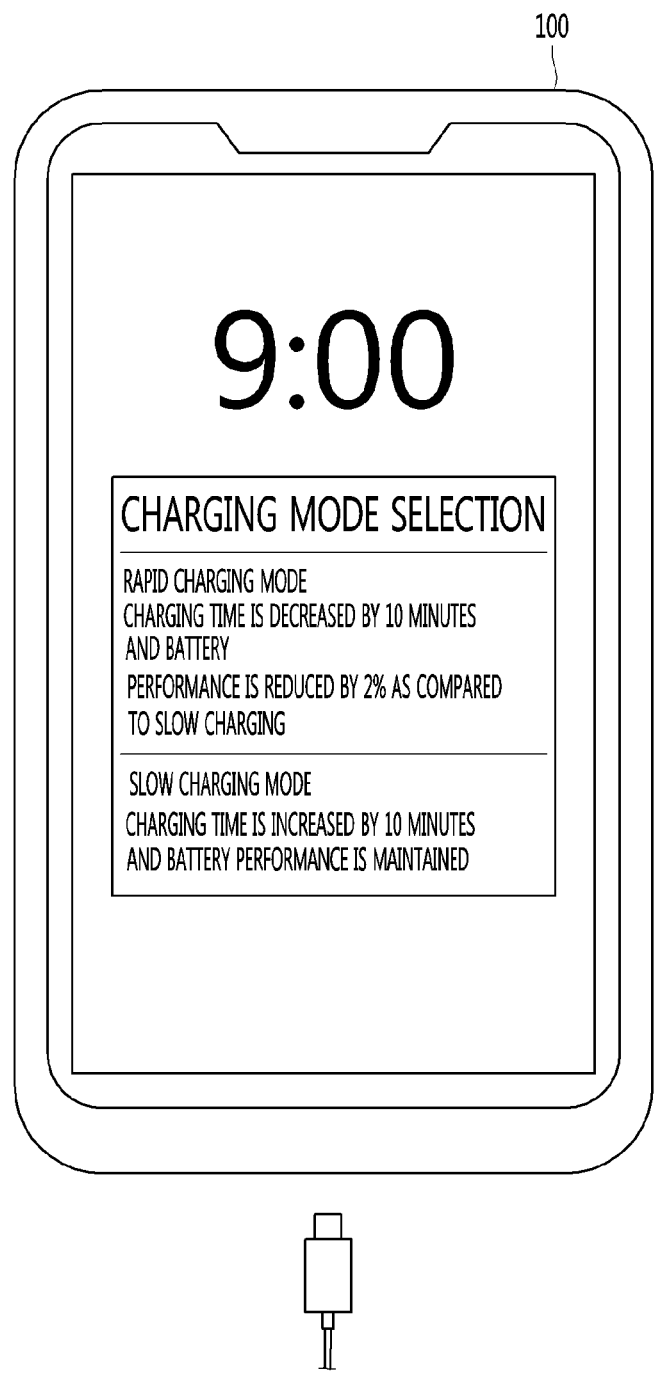
FIG. 9 is a diagram illustrating operation of a control option provision mode.

For example, as shown in FIG. 9, the first control option may be a rapid charging mode and the second control option may be a slow charging mode.

In addition, the controller 40 may display the detailed description of the first control option and the detailed description of the second control option based on the acquired characteristic parameter.

For example, the controller 40 may display a charging time and a battery performance reduction amount according to the first control rule as the detailed description of the first control option and display a charging time and a battery performance reduction amount according to the second control rule as the detailed description of the second control option.

Meanwhile, when input of selecting a specific control option among the plurality of control options is received through the input unit, the controller 40 may control charging or discharging of the battery according to the control rule corresponding to the selected specific control option (S660).

For example, when the first control option is selected, the controller 40 may perform charging with the first charging current value according to the first control rule.

Figure 10:
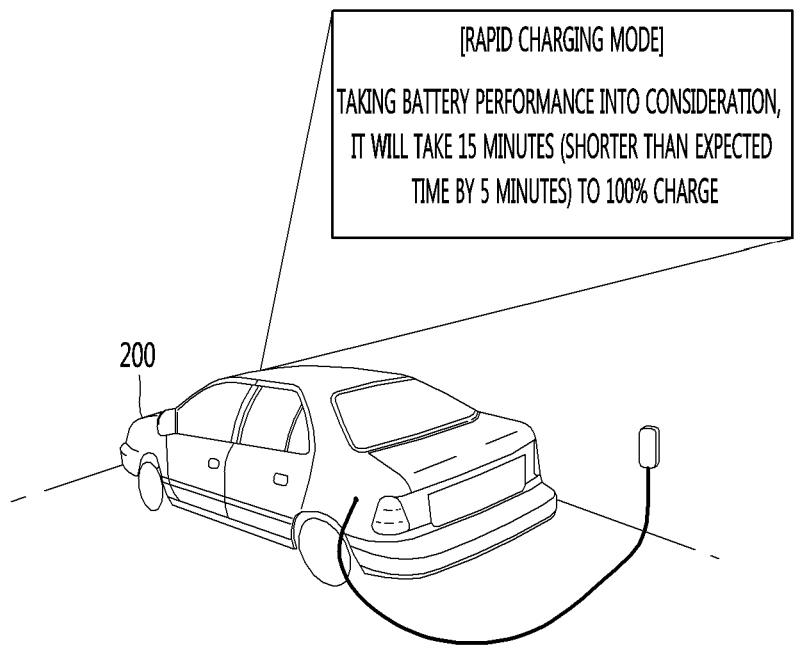
FIG. 10 is a view illustrating operation in a normal mode.

Meanwhile, if the operation mode of the device 10 including the battery is a normal mode, as shown in FIG. 10, the controller 40 may acquire a control rule based on the acquired characteristic parameter value and control charging or discharging of the battery according to the acquired control rule (S670).

For example, the controller 40 may acquire the control rule corresponding to the acquired characteristic parameter value. In addition, the controller 40 may perform control according to the acquired control rule. In addition, the controller 40 may acquire a charging time, a discharging time, a battery performance reduction amount according to the acquired control rule based on the acquired characteristic parameter value and output the acquired information.

Meanwhile, although the control rule corresponding to the internal state information of the battery is acquired according to a pre-stored table or the control rule corresponding to the characteristic parameter value is acquired according to the pre-stored table in the present invention, the present invention is not limited thereto.

Specifically, the controller may acquire the control rule corresponding to the sensed input/output parameter and the acquired characteristic parameter using a second artificial neural network trained based on reinforcement learning.

This will be described with reference to FIG. 11.

Figure 11:
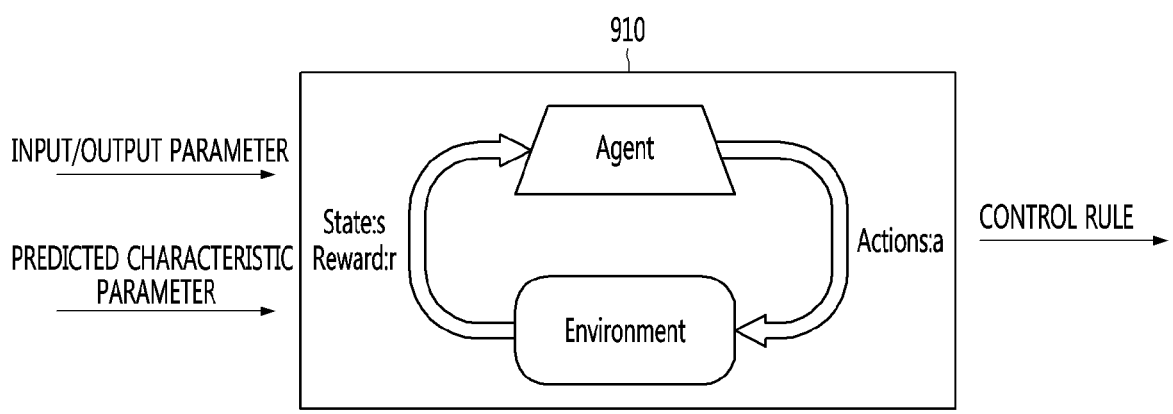
FIG. 11 is a view illustrating a method of acquiring an optimal control rule corresponding to a characteristic parameter through reinforcement learning according to an embodiment of the present invention.

FIG. 11 is a view illustrating a method of acquiring an optimal control rule corresponding to a characteristic parameter through reinforcement learning according to an embodiment of the present invention.

Reinforcement learning is a theory that an agent can find the best way through experience without data when an environment in which the agent may decide what action is taken every moment is given.

Reinforcement learning may be performed by a Markov decision process (MDP).

The Markov Decision Process (MDP) will be briefly described. First, an environment including information necessary for the agent to take a next action is given. Second, what action is taken by the agent in that environment is defined. Third, a reward given to the agent when the agent successfully takes a certain action and a penalty given to the agent when the agent fails to take a certain action are defined. Fourth, experience is repeated until a future reward reaches a maximum point, thereby deriving an optimal action policy.

Such a Markov Decision Process (MDP) is applicable to the second artificial neural network 910 according to the embodiment of the present invention.

Specifically, first, the sensed input/output parameter and the characteristic parameter corresponding to the sensed input/output parameter are given to the second artificial neural network 910. Second, setting of a control rule is defined in order to achieve a goal. Third, when the artificial intelligence unit achieves a goal, a reward is given. Fourth, the artificial intelligence unit 130 derives a control rule in which the sum of the rewards is maximized.

That is, the trained second artificial neural network may be trained to acquire the control rule corresponding to the sensed input/output parameter value and the acquired characteristic parameter value based on reinforcement learning for achieving a specific goal.

Here, the specific goal may be variously set. For example, the specific goal may be set by combining one or more goals such as a charge rate, stability at the time of charging, a battery lifespan management, battery performance management, etc.

Meanwhile, the second artificial neural network may variously change the control rule using a try-and-error method. When the input/output parameter and the characteristic parameter according to the changed control rule are acquired, the second artificial neural network may be trained to give a reward based on the acquired input/output parameter and characteristic parameter to calculate an optimal control rule.

In this case, the controller may acquire the control rule corresponding to the sensed input/output parameter value and the characteristic parameter value using the trained second artificial neural network.

For example, the second artificial neural network may variously change the charging current value using a try-an-error method, and may be trained to calculate an optimal charging current value capable of achieving a goal of shortening the lifespan of the battery and a goal of increasing a charge rate according to the input/output parameter and the characteristic parameter measured after the changed charging current value is used. In this case, the controller may perform optimal control corresponding to a current input/output parameter and characteristic parameter using the trained second artificial neural network.

Figure 12:
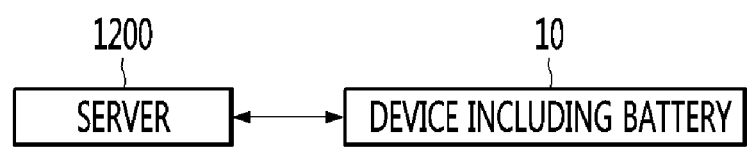
FIG. 12 is a view illustrating a reinforcement learning method through interworking with a server according to an embodiment of the present invention.

FIG. 12 is a view illustrating a reinforcement learning method through interworking with a server according to an embodiment of the present invention.

In FIG. 11, the second artificial neural network is installed in the device 10 including the battery and the controller 40 provides training data for training the second artificial neural network.

However, the present invention is not limited thereto and the second artificial neural network may be installed in a server 1200, the second artificial neural network installed in the server 1200 may perform reinforcement learning, and the server may update the trained second artificial neural network in the device 10 including the battery.

In this case, the device 10 including the battery may transmit the sensed input/output parameter value and the characteristic parameter value corresponding to the input/output parameter value to the server 1200. In addition, when the second artificial neural network is updated by training the characteristic parameter value corresponding to the input/output parameter value, the server 1200 may transmit the updated second artificial neural network to the device 10 including the battery.

In the present invention, by pre-learning a relationship between the input/output parameter of the battery and the internal characteristic parameter of the battery, it is possible to accurately calculate the internal characteristic parameter of the battery even after the battery is installed in a product.

In addition, since the internal characteristic parameter of the battery is a variety of time series data, it is very difficult to find a relationship between the characteristic parameter and the input/output parameter. However, the present invention is advantageous in that the relationship between the characteristic parameter and the input/output parameter is calculated by learning using the artificial neural network and deep learning.

In addition, conventionally, since the internal state of the battery was roughly grasped, control considering maximum error was performed for battery stability. For example, conventionally, after the number of times of charging the battery is determined and then it is assumed that the battery is in a worst state in a current number of times of charging, charging was performed using a current value suitable for the worst state. However, in the present invention, since the internal state of the battery can be accurately determined, it is possible to maximize the performance of the battery.

Meanwhile, the controller may be used interchangeably with a central processing unit, a microprocessor, a processor, etc.

The present invention mentioned in the foregoing description may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A method for controlling a battery of a device comprising a sensor and a controller, the method comprising:
   sensing, by the sensor, an input/output parameter value of the battery;
   acquiring, by the controller, a characteristic parameter value of the battery corresponding to the sensed input/output parameter value using a trained artificial neural network; and
   controlling, by the controller, charging or discharging of the battery based on the acquired characteristic parameter value,
   wherein the trained artificial neural network is an artificial neural network trained to calculate the characteristic parameter value corresponding to the sensed input/output parameter value using training data,
   wherein the characteristic parameter value includes at least one of electronic conductivity, solid diffusivity, a reaction rate constant of exchange current, tortuosity, porosity, electrolyte concentration, electrolyte conductivity, electrolyte diffusivity, a transference number, difference between capacity of an anode and capacity of a cathode due to degradation, or a degree of reduction in capacity of the anode/cathode as a parameter indicating a state of an internal material of the battery.

2. The method of claim 1, wherein the training data includes an input/output parameter value of one or more batteries corresponding to the battery and a characteristic parameter value corresponding to the input/output parameter value of the one or more batteries.

3. The method of claim 1, wherein:
   the controlling of charging or discharging of the battery comprises:
   acquiring internal state information of the battery based on the characteristic parameter value; and
   controlling charging or discharging of the battery based on the internal state information; and
   the internal state information is at least one of deterioration of the battery, a degree of abnormality, a charge threshold, or a discharge threshold.

4. The method of claim 1, wherein the input/output parameter value includes at least one of a voltage, current, or a temperature as a parameter measured outside the battery.

5. The method of claim 1, wherein the controlling of charging or discharging of the battery comprises controlling charging or discharging of the battery according to a control rule corresponding to the acquired characteristic parameter value among a plurality of control rules stored in a memory.

6. The method of claim 1, further comprising:
training a second artificial neural network to acquire a control rule corresponding to the sensed input/output parameter value and the acquired characteristic parameter value based on reinforcement learning for achieving a specific goal; and
acquiring a control rule corresponding to the sensed input/output parameter value and the acquired characteristic parameter value using the trained second artificial neural network.

7. The method of claim 1, wherein:
the trained artificial neural network is a deep neural network; and
the acquiring of the characteristic parameter value includes acquiring the characteristic parameter value using the input/output parameter value sensed for a predetermined time.

8. The method of claim 1, further comprising:
acquiring internal state information of the battery based on the characteristic parameter value; and
displaying the internal state information.

9. A device comprising:
a battery;
a sensor configured to sense an input/output parameter value of the battery; and
a controller configured to:
  acquire a characteristic parameter value of the battery corresponding to the sensed input/output parameter value using a trained artificial neural network; and
  control charging or discharging of the battery based on the acquired characteristic parameter value,
wherein the trained artificial neural network is an artificial neural network trained to calculate the characteristic parameter value corresponding to the sensed input/output parameter value using training data,
wherein the characteristic parameter includes at least one of electronic conductivity, solid diffusivity, a reaction rate constant of exchange current, tortuosity, porosity, electrolyte concentration, electrolyte conductivity, electrolyte diffusivity, a transference number, difference between capacity of an anode and capacity of a cathode due to degradation, or a degree of reduction in capacity of the anode/cathode as a parameter indicating a state of an internal material of the battery.

10. The device of claim 9, wherein the training data includes an input/output parameter value of one or more batteries corresponding to the battery and a characteristic parameter value corresponding to the input/output parameter value of the one or more batteries.

11. The device of claim 9, wherein:
the controller is further configured to:
  acquire internal state information of the battery based on the characteristic parameter value; and
  control charging or discharging of the battery based on the internal state information; and
the internal state information is at least one of deterioration of the battery, a degree of abnormality, a charge threshold, or a discharge threshold.

12. The device of claim 9, wherein the input/output parameter includes at least one of a voltage, current, or a temperature as a parameter measured outside the battery.

13. The device of claim 9, further comprising a memory configured to store a plurality of control rules,
wherein the controller is further configured to control charging or discharging of the battery according to a control rule corresponding to the acquired characteristic parameter value among the plurality of control rules.

14. The device of claim 9, wherein:
the controller is further configured to acquire a control rule corresponding to the sensed input/output parameter value and the acquired characteristic parameter value using a trained second artificial neural network; and
the trained second artificial neural network is an artificial neural network trained to acquire a control rule corresponding to the sensed input/output parameter value and the acquired characteristic parameter value based on reinforcement learning for achieving a specific goal.

15. The device of claim 9, wherein:
the trained artificial neural network is a deep neural network; and
the controller is further configured to acquire the characteristic parameter value using the input/output parameter value sensed for a predetermined time.

16. A device comprising:
a display;
an input interface;
a battery;
a sensor configured to sense an input/output parameter value of the battery; and
a controller configured to:
  acquire a characteristic parameter value of the battery corresponding to the sensed input/output parameter value using a trained artificial neural network; and
  control charging or discharging of the battery based on the acquired characteristic parameter value,
wherein the trained artificial neural network is an artificial neural network trained to calculate the characteristic parameter value corresponding to the sensed input/output parameter value using training data;
  cause the display to display a plurality of control options, each corresponding to a respective one of a plurality of control rules, based on the acquired characteristic parameter value; and
  when an input of selecting a specific control option among the plurality of control options is received through the input interface, control charging or discharging of the battery according to a control rule corresponding to the specific control option.

* * * * *